US007633511B2

(12) United States Patent
Shum et al.

(10) Patent No.: US 7,633,511 B2
(45) Date of Patent: Dec. 15, 2009

(54) POP-UP LIGHT FIELD

(75) Inventors: Heung-Yeung Shum, Bellevue, WA (US); Jian Sun, Beijing (CN); Shuntaro Yamazaki, Tokyo (JP); Yin Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 10/817,516

(22) Filed: Apr. 1, 2004

(65) Prior Publication Data

US 2005/0219264 A1    Oct. 6, 2005

(51) Int. Cl.
G09G 5/00    (2006.01)
(52) U.S. Cl. .................. 345/628; 345/426; 345/428; 345/611; 345/620; 345/634; 382/294; 382/302
(58) Field of Classification Search .................. 345/628
See application file for complete search history.

(56) References Cited

U.S. PATENT DOCUMENTS 6,064,393 A * 5/2000 Lengyel et al. ............. 345/427
6,134,346 A   10/2000 Berman et al.

OTHER PUBLICATIONS

Williams, "Pyramidal Parametrics", Jul. 1983, ACM, pp. 1-11.*
Buehler, C., Bosse, M., McMillan, L., Gortler, S., Cohen, M.; "Unstructured Lumigraph Rendering" Proceedings of ACM SIGGRAPH 2001, pp. 425-432.
Baker, S., Szeliski, R., Anandan, P.; "A Layered Approach to Stereo Reconstruction" In IEEE Computer Society Conference on Computer Vision and Pattern REcognition CVPR 1998, pp. 434-441.
Chuang, Y.-Y., Agarwala, A., Curless, B., Salesin, D.H., Szeliski, R.; "Video Matting of Complex Scenes" In Proceedings of ACM SIGGRAPH 2002, pp. 243-248.
Chuang, Y.-Y., Curless, B., Salesin, D.H., Szeliski, R.; "A Bayesian Approach to Digital Matting" In IEEE Computer Society Conference on Computer Vision and Pattern Recognition (CVPR 2001) pp. 264-271.
Criminisi, A., Reid, I., Zisserman, A.; "Single View Metrology" In Proceedings of Seventh International Conference on Computer Vision (ICCV 1999) pp. 434-441.
Debevec, P., Taylor, C., Malik, J.; "FACADE: Modeling and Rendering Architecture from Photographs" In Proceedings of ACM SIGGRAPH 1996, published on the internet at http://www.debevec.org/Research/, 4 pages.
Horry, Y., Anjyo, K., Arai, K.; "Tour Into the Picture: Using a Spidery Mesh Interface to Make Animation from a Single Image" In Proceedings of ACM SIGGRAPH 1997, pp. 225-232.

(Continued)

*Primary Examiner*—Antonio A Caschera
(74) *Attorney, Agent, or Firm*—Lee & Hayes, PLLC

(57) ABSTRACT

Virtual views of a complex scene are produced for a user to view. The virtual views are substantially free from aliasing even when using a relatively sparse set of images of the scene. In a described implementation, a scene is split into one or more coherent layers. The boundaries of the coherent layers are propagated across a plurality of frames corresponding to the scene. The splitting may be further refined (e.g., in accordance with user feedback) to present a virtual view of the scene.

16 Claims, 15 Drawing Sheets

OTHER PUBLICATIONS

Kang, S. B., Szeliski, R., Chai, J.; "Handling Occlusions in Dense Multi-View Stereo" In IEEE Computer Society Conference on Computer Vision and Pattern Recognition (CVPR 2001) pp. 103-110.

Isaksen, A., McMillan, L., Gortler, S. J.; "Dyanmically Reparameterized Light Fields" In Proceedings of ACM SIGGRAPH 2000, pp. 297-306.

Ke, Q., Kanade, T.; "A Robusdt Subspace Approach to Layer Extraction" In IEEE Workshop on Motion and Video Computing 2002 pp. 233-242.

Kolmogorov, V., Zabih, R.; "Multi-Camera Scene Reconstruction via Graph Cuts" In Proc. European Conference on Computer Vision, 2002, pp. 233-242.

Lengyel, J., Snyder, J.; "Rendering with Coherent Layers" In Proceedings of ACM SIGGRAPH 1997, pp. 233-242.

Levoy, M., Hanrahan, P.; "Light Field Rendering" In Proceedings of ACM SIGGRAPH 1996, pp. 31-42.

Matusik, W., Buehler, C., Raskar, R., Gortler, S. J., McMillan, L.; "Image-Based Visual Hulls" In Proceedings of ACM SIGGRAPH 2000, pp. 369-374.

Matusik, W., Pfister, H., Ngan, A., Beardsley, P., Ziegler, R., McMillan, L.; "Image-Based 3D Photography Using Opacity Hulls" In Proceedings of ACM SIGGRAPH 2002, pp. 427-437.

Ruzon, M. A., Tomasi, C.; "Alpha Estimation in Natural Images" IEEE Conference on Computer Vision and Pattern Recognition 2000, 8 pgs.

Porter, T., Duff, T.; "Compositing Digital Images" ACM 1984 pp. 253-259.

Rademacher, P.; "View-Dependent Geometry" In Proceedings of ACM SIGGRAPH, 1999, 8 pgs.

Oh, B. M., Chen, M., Dorsey, J., Durad, F.; "Image-Based Modeling and Photo Editing" In Proceedings of ACM SIGGRAPH 2001, pp. 433-442.

Seitz, S., Kutulakos, K. N.; "Plenoptic Image Editing" In Proceedings of Seventh International Conference on Computer Vision (ICCV 1998) pp. 1-29.

Shade, J., Gortler, S., He, L., Szeliski, R.; "Layered Depth Images" In Proceedings of ACM SIGGRAPH 1998, pp. 231-242.

Smith A. R., Blinn, J. F.; "Blue Screen Matting" In Proceedings of ACM SIGGRAPH 1996, pp. 259-268.

Szeliski, R., Shum, H.-Y.; "Creating Full View Panoramic Image Mosaics and Enviroment Maps" In Proceedings of aCM SIGGRAPH 1997, pp. 251-258.

Wang, J. Y. A., Adelson, E. H.; "Representing Moving Images with Layers" IEEE Transaction on Image Processing Specila Issue: Image Sequesnce Compression vol. 3, No. 5, Sep. 1994, pp. 625-638.

Wexler, Y., Fitzgibbon, A., Zisserman, A., "Bayesian Estimation of Layers from Multiple Images" In Proc. of European Conference on Computer Vision, 2002, pp. 487-501.

Yamazaki, S., Sagawa, R., Kawasaki, H., Ikeuchi, K., Sakauchi, M.; "Microfacet Billboarding" The Eurographics Association, Thriteenth Eurographics Workshop on Rendering, 2002, 12 pgs.

Zhang, Z., Wang, L., Guo, B., Shum, H.-Y.; "Feature-Based Light Field Morphing" In Proceedings of ACM SIGGRAPH 2002, pp. 457-464.

Rusinkiewicz, S., Hall-Holt, O., Levoy, M.; "Real-Time 3D Model Acquisition" In Proceedings of ACM SIGGRAPH 2002, pp. 438-446.

Chai, J.-X., Tong, X., Chan, S.-C., Shum, H.-Y.; "Plenotic Sampling" In Proceedings of ACM SIGGRAPH 2000 pp. 307-318.

Schaufler, G.; "Dynamicall Generated Impostors" GI Workshop Modeling—Virtual Worlds—Distributed Graphics, Nov. 1995 pp. 129-135 Abstract.

Heigl, B., Koch, R., Polleyfeys, M., Denzler, J., Gool, L.V.; "Plenoptic Modeling and Rendering from Image Sequences Taken by a Hand-Held Camera" In Symposium fur Mustererkennung, 1999 pp. 94-101 Abstract.

Gortler, S., Grzeszczuk, R., Szeliski, R., Cohen, M., "The Lumigraph" In Proceedings of ACM SIGGRAPH, 1996, pp. 43-54 Abstract.

* cited by examiner

POP-UP LIGHT FIELD RENDERING

CONVENTIONAL SPARSE LIGHT FIELD RENDERING

POP-UP LIGHT FIELD WITH FOUR LAYERS

POP-UP LIGHT FIELD WITH TWO LAYERS

SPARSE LIGHT FIELD

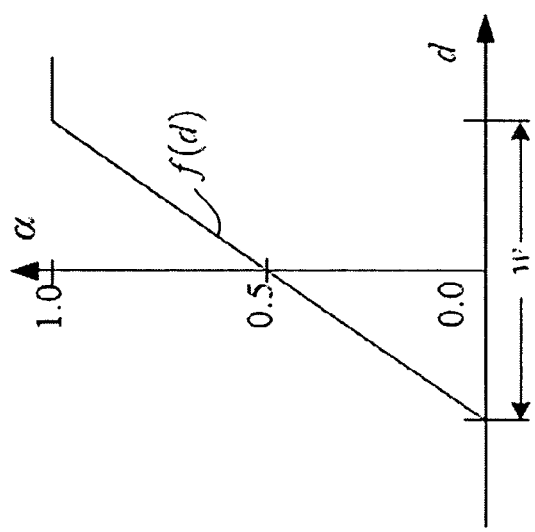
FIG. 8
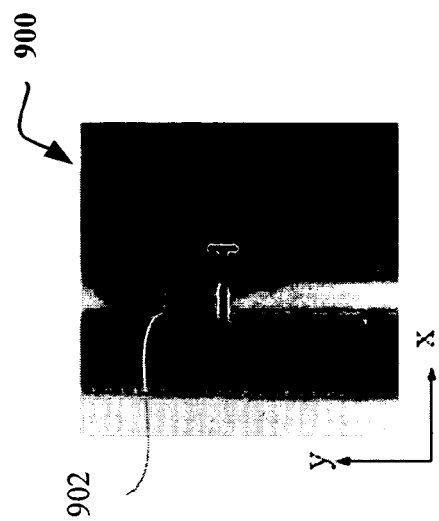
FIG. 9
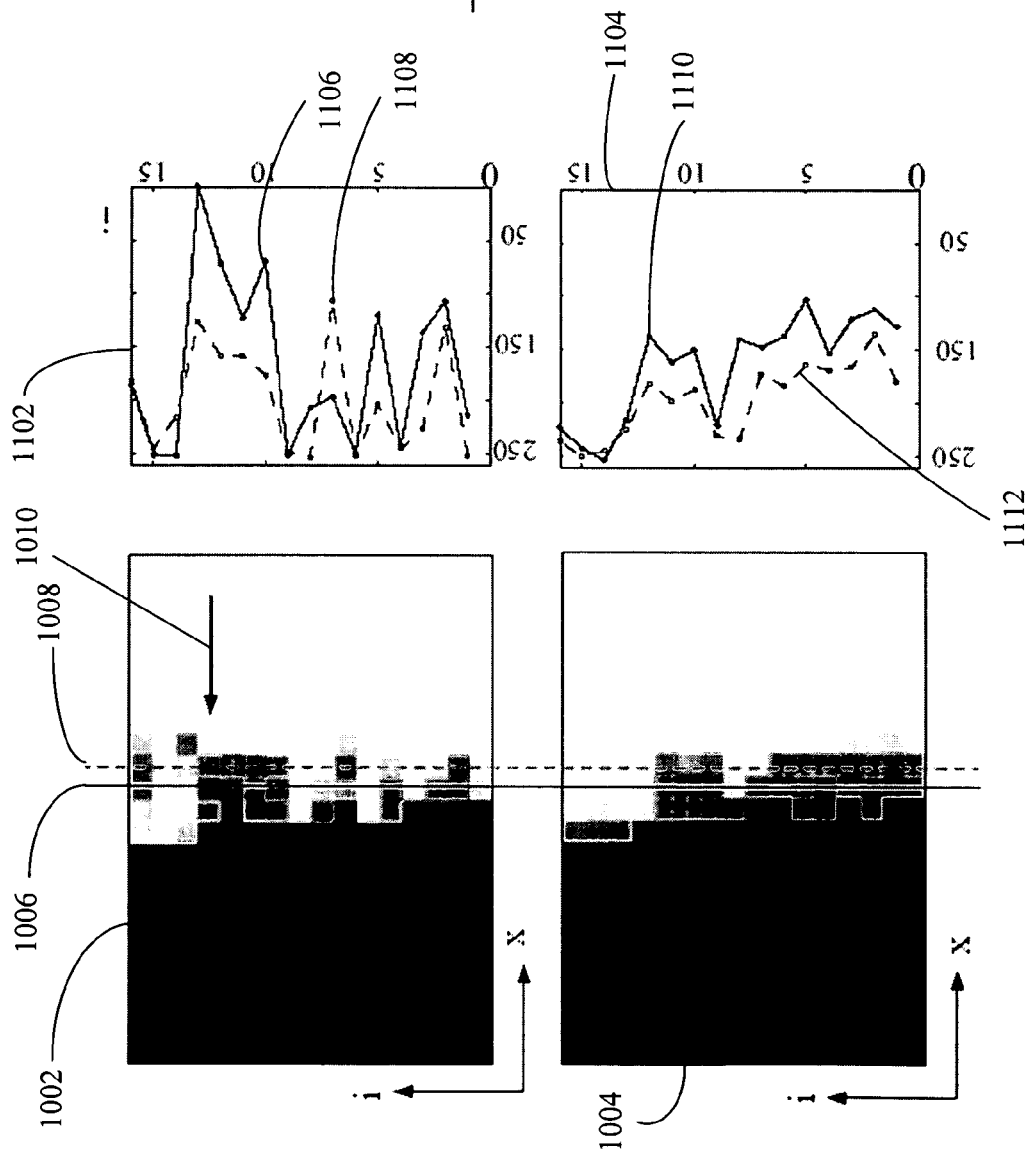
FIG. 10
FIG. 11

FIG. 12 REFERENCE IMAGE
FIG. 13 VIDEO MATTING
FIG. 14 COHERENCE MATTING

EDITING VIEW
1602    1604

REFERENCE VIEW
1702    1704

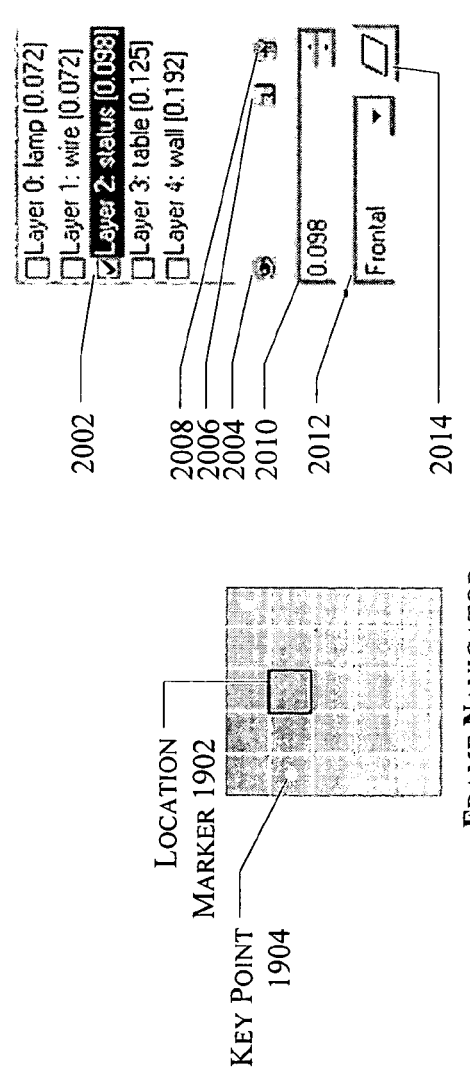
FIG. 21 NEIGHBORING FRAME SELECTION
FIG. 20 LAYER NAVIGATOR
FIG. 19 FRAME NAVIGATOR

FIG. 23
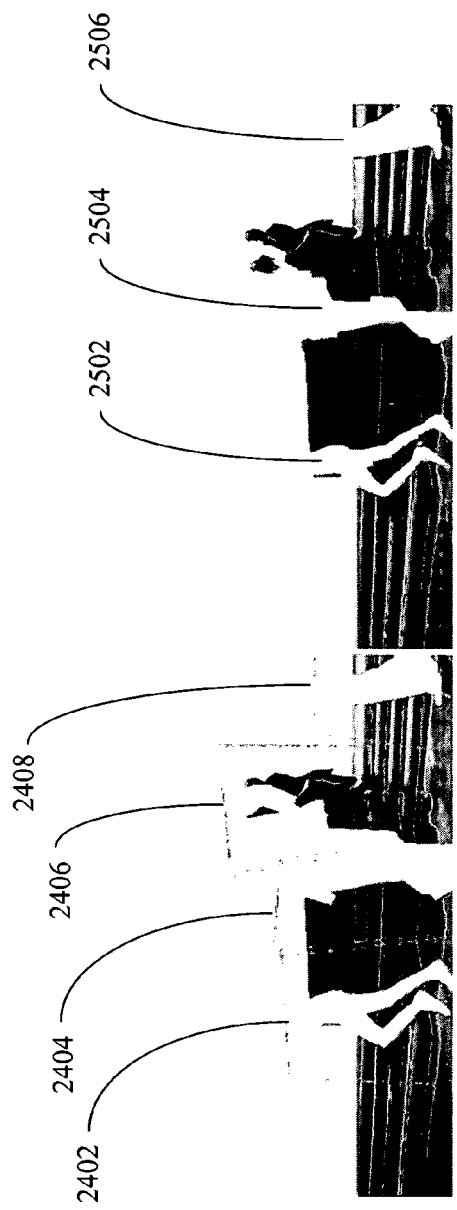
FIG. 24
FIG. 25

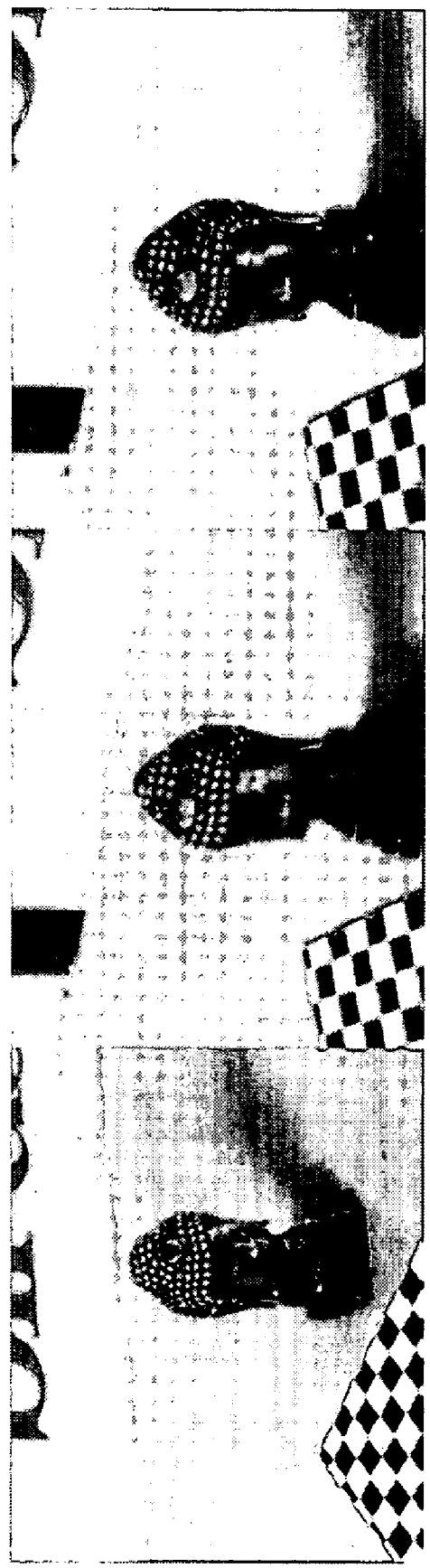
Fig. 26 Global Plane
Fig. 27 Different View Rendered with Global Plane
Fig. 28 View Rendered with Local Geometry

POP-UP LIGHT FIELD

TECHNICAL FIELD

The present invention generally relates to digital imaging technology. More particularly, one of the described implementations utilizes pop-up light fields of a scene to present a novel virtual view of the scene.

BACKGROUND

As computer technology improves, computer systems with more powerful processor(s) and larger storage unit(s) become more commonplace. With this growth of processing power and storage unit size, implementation of digital imaging technology also becomes more practical. For example, higher resolution images may be processed in a shorter time period.

An advantage of digital imaging technology is the ability to render the digital images. Rendering an image generally involves producing a synthetic or virtual image using a computer. For example, different light sources may be applied to a scene from different angles and with different intensities to generate a virtual view of the scene. One type of rendering is image-based rendering (IBR), where rendering techniques are applied to a set of sample input images (e.g., digital pictures taken by a digital camera or conventional pictures scanned into a computer).

Central to many IBR systems is the goal of interpolating accurately between the sample images in order to generate novel views. In IBR, rendering a desired pixel is often equivalent to interpolating intensity values of some input pixels. Such an interpolation, however, depends on the correspondence between the rendered pixel and those pixels from the input sample images. Often, accurate correspondence between these pixels can be obtained if a large number of input images or an accurate geometric model of the scene is available.

When such information is unavailable, one solution is to perform stereo reconstruction or to establish correspondence between pixels of the input images. However, state-of-the-art automatic stereo algorithms are inadequate for producing sufficiently accurate depth information for realistic rendering when using a relatively sparse set of images of a complex scene. Typically, the areas around occlusion boundaries in the scene have the least desirable results, because it is very hard for stereo algorithms to handle occlusions without prior knowledge of the scene.

Accordingly, current solutions fail to produce virtual views free of aliasing when using a relatively sparse set of images of a complex scene.

SUMMARY

Techniques are disclosed to present virtual views of a complex scene. The virtual views are substantially free from aliasing even when using a relatively sparse set of images of the scene.

In a described implementation, a scene is split into one or more coherent layers. The boundaries of the coherent layers are propagated across a plurality of frames corresponding to the scene. The splitting may be further refined (e.g., in accordance with user feedback) to present a virtual view of the scene.

In another described implementation, a user interface (UI) includes a layer pop-up module to allow a user to define one or more coherent layers corresponding to a scene. A refinement module within the UI permits the user to refine the coherent layers (e.g., to ensure substantially anti-aliased rendering). The UI further includes a rendering module to render the refined coherent layers to present a virtual view of the scene.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 8 illustrates an exemplary feathering function that defines the α value for surrounding pixels of a layer boundary.

FIG. 9 illustrates an exemplary image (which is a small window on one frame in the plaza data of FIG. 23).

FIG. 10 illustrates exemplary alpha epipolar plane images (α-EPI) corresponding to the scanline 902 of FIG. 9.

FIG. 11 illustrates exemplary alpha curves for the two adjacent lines 1006 and 1008 of FIG. 10.

FIGS. 12-14 illustrate a comparison of video matting and coherence matting.

FIG. 19 illustrates an exemplary frame navigator for the UI of FIG. 15.

FIG. 20 illustrates an exemplary layer navigator for the UI of FIG. 15.

FIG. 21 illustrates an exemplary neighboring frame selection display for a 2 D array.

FIG. 23 illustrates an exemplary sample image of a plaza.

FIG. 24 illustrates an exemplary segmentation of a background layer of the image of FIG. 23 into sub layers using polygons.

FIG. 25 illustrates an exemplary resulting background corresponding to FIG. 24 wherein many missing pixels are filled.

FIGS. 26-28 illustrate exemplary results when applying local geometry versus global geometry.

DETAILED DESCRIPTION

The following disclosure describes the generation of novel virtual views of a scene that are substantially free from aliasing even when using a relatively sparse set of images of a complex scene. An interactive image-based modeling and rendering solution is provided to limit the anti-aliasing affects. More specifically, multiple images of a same subject are taken from different angles. A user may then interactively cut out (or define) different objects (including backgrounds) within the images. The cut-outs may be treated as different coherent layers. Using the multiple images and the layers, different photorealistic views of the subject may be rendered. Coherence matting (which uses Bayesian techniques) can be used to reduce or eliminate problems present at the boundaries of the defined objects.

Anti-Aliasing Examples

Figure 1:
FIG. 1 illustrates an image rendered by applying conventional sparse light field rendering.

FIG. 1 illustrates an image rendered by applying conventional sparse light field rendering. As can be seen, objects within the illustrated light field of FIG. 1 are aliased. Aliasing is especially visible near front objects (such as the lamp) because the input light field is sparse.

Figure 2:
FIG. 2 illustrates an exemplary view of the image illustrated in FIG. 1 after application of pop-up light field rendering.

FIG. 2 illustrates an exemplary view of the image illustrated in FIG. 1 after application of pop-up light field rendering. As illustrated, the anti-aliased rendering can be achieved when applying the techniques discussed herein. For example, the front objects (such as the lamp) are substantially anti-aliased when compared with the front objects of FIG. 1.

Progression of Pop-Up Light Field Rendering

Figure 5:
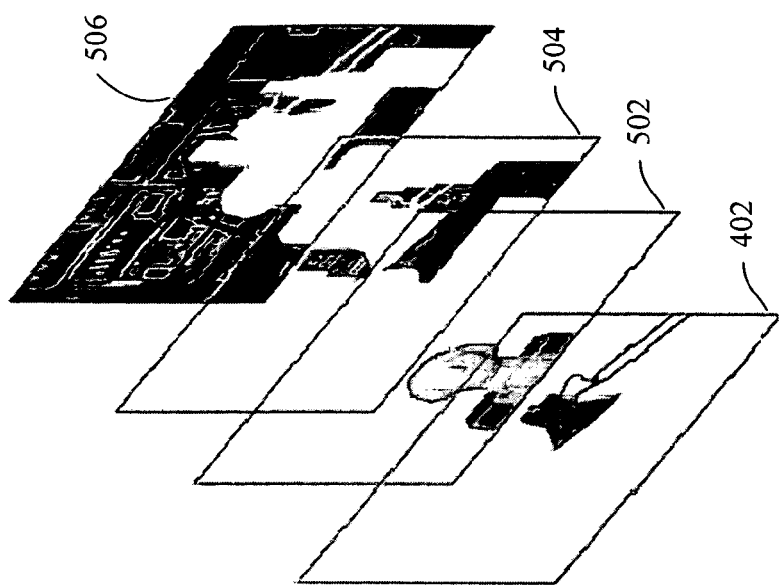
FIG. 5 illustrates an exemplary pop-up light field with four layers corresponding to the image of FIG. 2.
Figure 4:
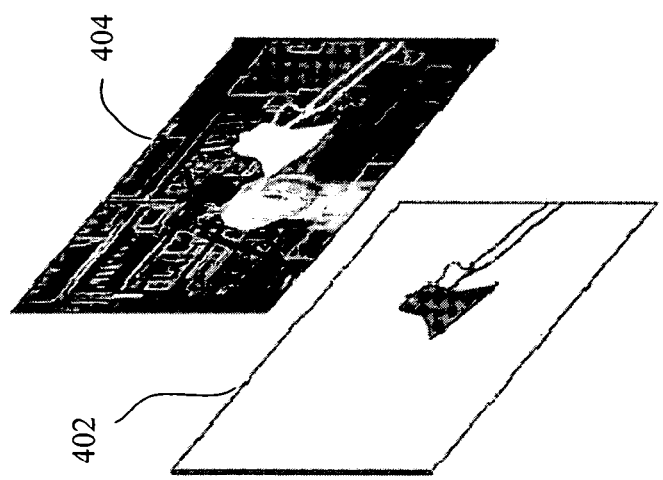
FIG. 4 illustrates an intermediate image (between the images of FIGS. 1 and 2) with two layers 402 and 404 which in combination represent the single plane 302 of FIG. 3.
Figure 3:
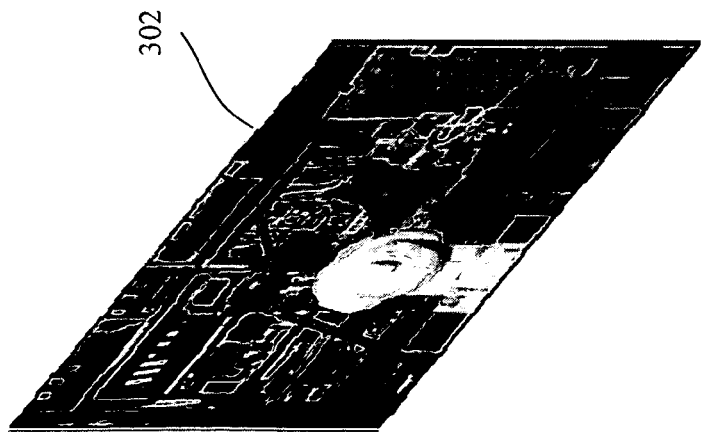
FIG. 3 illustrates a sparse light field with a single focal plane 302 in the illustrated scene (which corresponds to the image of FIG. 1).

FIGS. 3-5 illustrate exemplary progression of pop-up light field rendering corresponding with the images of FIGS. 1 and 2. In particular, FIG. 3 illustrates a sparse light field with a single focal plane 302 in the illustrated scene (which corresponds to the image of FIG. 1). FIG. 4 illustrates an intermediate image (between the images of FIGS. 1 and 2) with two layers 402 and 404 which in combination represent the single plane 302 of FIG. 3. FIG. 5 illustrates an exemplary pop-up light field with four layers (402, 502, 504, and 506) corresponding to the image of FIG. 2. As illustrated, objects within each of the four layers (402, 502, 504, and 506) are substantially anti-aliased in FIG. 2.

Accordingly, by splitting the scene into multiple layers, the depth variation in each layer becomes much smaller than that in the original sparse light field. Also, the pop-up light field is represented by a collection of coherent layers (as will be discussed further with respect to the remaining figures such as FIG. 6). In an implementation, the number of coherent layers that should be modeled or "popped up" depends on the complexity of the scene and/or how under-sampled the input light field is. For example, for a sparser light field, more layers may be popped up for substantially anti-aliased rendering.

Coherent Layers

Figure 6:
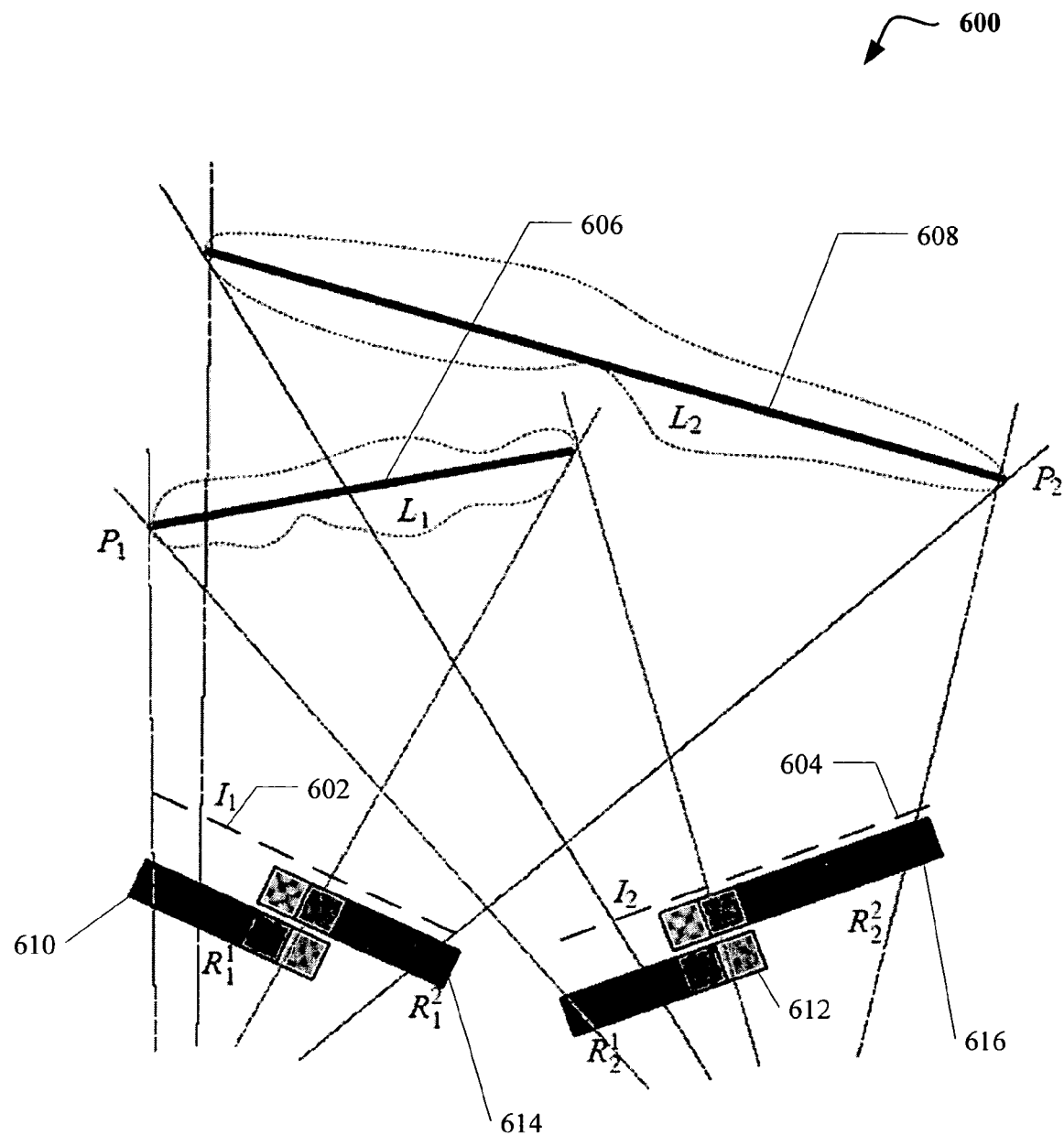
FIG. 6 illustrates an exemplary light field 600 with coherent layers.

FIG. 6 illustrates an exemplary light field 600 with coherent layers. The light field 600 includes images 602 ($I_1$) and 604 ($I_2$) that are represented by a set of coherent layers 606 ($L_1$) and 608 ($L_2$), respectively. Generally, a coherent layer is a collection of layered images in the light field. For instance, the layer 606 ($L_1$) is represented by layered images 610 (from $I_1$) and 612 (from $I_2$). Similarly, the layer 608 ($L_2$) is represented by layered images 614 (from $I_1$) and 616 (from $I_2$). Part of the scene corresponding to each layer is, in turn, modeled as a plane (e.g., $P_1$ for $L_1$ and $P_2$ for $L_2$, respectively).

As illustrated in FIG. 6, a coherent layer $L_j$ can be represented by a collection of corresponding layered image regions $R_j^i$ in the light field images $I^i$. These regions can be modeled by a simple geometric proxy without the need for accurate per-pixel depth. For example, a global planar surface ($P_j$) is used as the geometric proxy for each layer $L_j$ in the example shown in FIG. 6. To deal with complicated scenes and camera motions, a local planar surface $P_j^i$ may be utilized to model the layer in every image i of the light field.

A layer in the pop-up light field is considered as "coherent" if the layer can be rendered substantially free of aliasing by using a simple planar geometric proxy (global or local). Anti-aliased rendering may occur at two levels, when: (1) the layer itself is rendered; and (2) the layer is rendered with its background layers. Therefore, to satisfy the first condition, the depth variation in each layer can be configured to be sufficiently small. Moreover, the planar surface can be adjusted interactively to achieve the best rendering effect.

To meet the second condition, accurate layer boundaries can be maintained across the frames to construct the coherent layers. In one implementation, to ensure segmentation coherence across a group of the frames, the segmented regions on one or more key frames are propagated to the remaining frames. Sub-pixel precision segmentation may be obtained on the key frames by meticulously zooming on the images and tracing the boundaries. Propagation from key frames to other frames, however, may cause under-segmentation or over-segmentation of a foreground layer. Typically, over-segmentation of a foreground layer leads to the inclusion of background pixels; thus, introducing ghosting along the occlusion boundaries in the rendered image. To alleviate the rendering artifacts caused by over-segmentation or under-segmentation of layers, the layer boundary may be refined with alpha matting. For example, with respect to FIG. 6, the pixels at each coherent layer have consistent depth values (e.g., within a depth bound), but may have different fractional alpha values along the boundary. Accordingly, each of the layered images may have an alpha matte associated with its boundary.

To produce fractional alpha mattes for the regions in a coherent layer, video matting may be applied. The video matting problem is formulated as a maximum a posterior (MAP) estimation as in Bayesian matting:

$$\arg\max_{F,B,\alpha} P(F, B, \alpha \mid C) = \arg\max_{F,B,\alpha} L(C \mid F, B, \alpha) + L(F) + L(B) + L(\alpha) \quad (1)$$

where $L(\cdot)=\log P(\cdot)$ is log likelihood, C is the observed color for a pixel, and F, B and $\alpha$ are foreground color, background color, and alpha value to be estimated, respectively. For color images, C, F, and B are vectors in red-green-blue (RGB) space. In Bayesian matting and video matting, the log likelihood for the alpha $L(\alpha)$ is assumed to be constant, so that $L(\alpha)$ is dropped from Equation (1).

In video matting, the optical flow is applied to the tri-map (the map of foreground, background, and uncertain region), but not to the output matte. The output foreground matte is produced by Bayesian matting on the current frame, based on the propagated tri-map. In an implementation, to make video matting work well, the foreground mattes are replayed against a different background. However, these foreground mattes may not have in-between frame coherence that may be needed for generating novel views.

Coherence Matting

Figure 7:
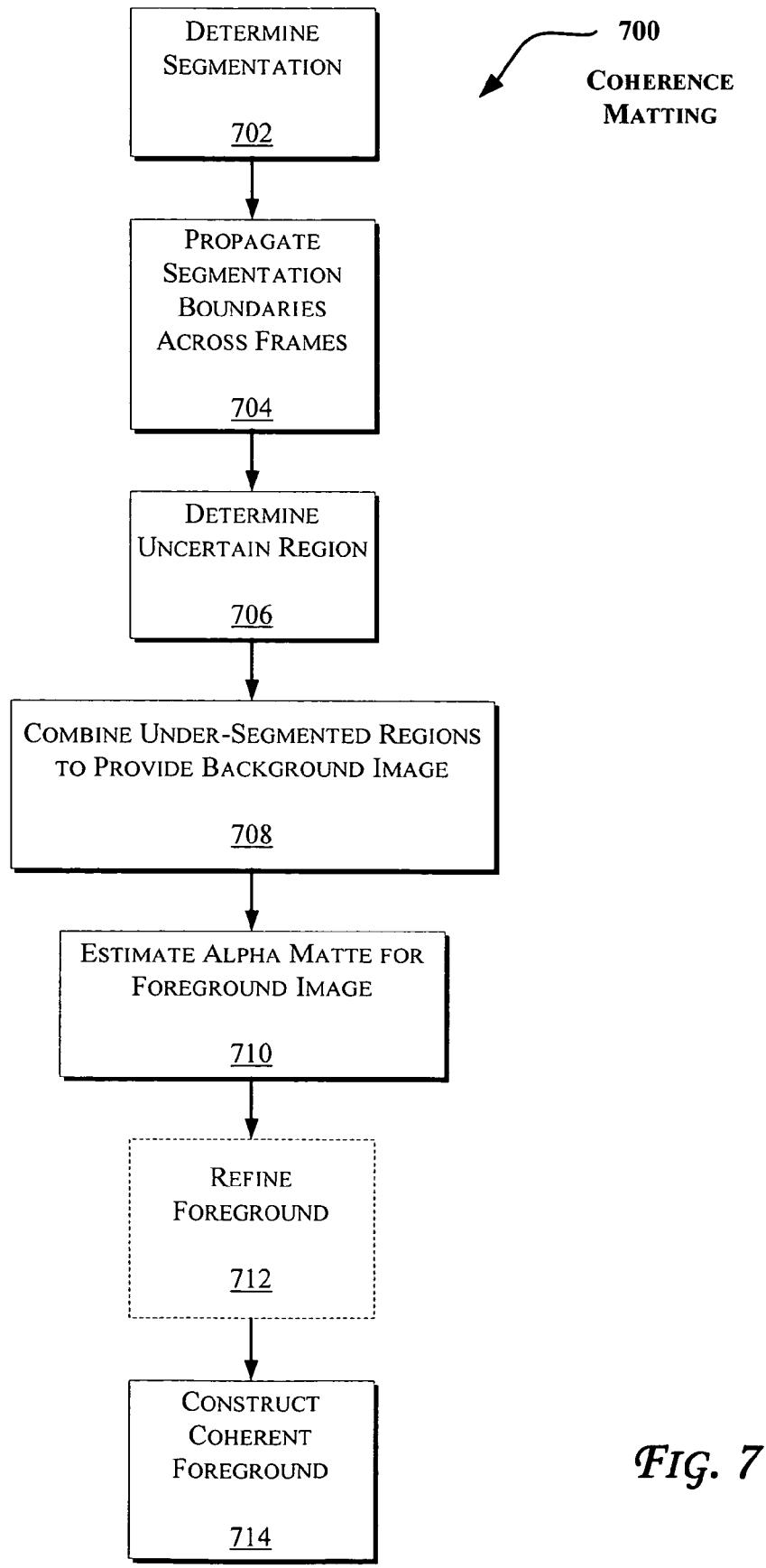
FIG. 7 illustrates an exemplary coherence matting method 700 which may be utilized to construct the alpha mattes in a coherent layer that have in-between frame coherence.

FIG. 7 illustrates an exemplary coherence matting method 700 which may be utilized to construct the alpha mattes in a coherent layer that have in-between frame coherence. In one implementation, the method 700 may have a workflow similar to video matting. In a stage 702, segmentation of the scene is determined. For example, a user may specify approximate boundaries for select objects (e.g., the layer 402 of FIG. 4). A stage 704 propagates the segmentation boundaries across frames. In a stage 706, an uncertain region along the boundary is determined. As a result, the uncertain region is between the foreground and background. A stage 708 combines the under-segmented background regions from multiple images to construct a sufficient background image. Alpha matte for the foreground image (i.e., in the uncertain region) is estimated in a stage 710.

The method 700 may also include an optional stage 712 to enable refinement of the foreground (e.g., through user feedback). A stage 714 constructs the coherent foreground layer. In an implementation, a coherent feathering function (such as the one illustrated in FIG. 8 and further discussed below) is applied across the corresponding layer boundaries. Also, for a given layer, a separate foreground matte may be estimated independently for each frame in the light field, and the coherence across frames may be maintained by foreground boundary consistency.

L(B) in Equation (1) can be dropped since the background is explicitly estimated. By incorporating a coherence prior on the alpha channel L($\alpha$) across frames, coherence matting can be formulated as:

$$L(F, B, \alpha | C) = L(C|F, B, \alpha) + L(F) + L(\alpha) \qquad (2)$$

where the log likelihood for the alpha L($\alpha$) is modeled as:

$$L(\alpha) = -\frac{(\alpha - \alpha_0)^2}{\sigma_a^2} \qquad (3)$$

where $\alpha_0 = f(d)$ is a feathering function of d, $\sigma_\alpha^2$ is the standard deviation, and d is the distance from the pixel to the layer boundary.

The feathering function $f(d)$ defines the a value for surrounding pixels of a boundary. In an implementation, the feathering function is set as: $f(d) = (d/w)*0.5 + 0.5$, where w is feathering width, as illustrated in FIG. 8.

Assuming that the observed color distribution P(C) and sampled foreground color distribution P(F) (from a set of neighboring foreground pixels) are of Gaussian distribution:

$$L(C | F, B, \alpha) = -\|C - \alpha F - (1 - \alpha)B\|^2 / \sigma_C^2 \qquad (4)$$

$$L(F) = -(F - \overline{F})^T \sum_F^{-1} (F - \overline{F}) \qquad (5)$$

where $\sigma_c$ is the standard deviation of the observed color C, $\overline{F}$ is the weighted average of foreground pixels, and $\Sigma_F$ is the weighted covariance matrix. Taking the partial derivatives of equation (2) with respect to F and $\alpha$ and forcing them equal to zero results in the following equations:

$$F = \frac{\sum_F^{-1} \overline{F} + C\alpha/\sigma_C^2 - B\alpha(1-\alpha)/\sigma_C^2}{\sum_F^{-1} + I\alpha^2/\sigma_C^2} \qquad (6)$$

$$\alpha = \frac{(C-B)\cdot(F-B) + \alpha_0 \cdot \sigma_C^2/\sigma_a^2}{\|F-B\|^2 + \sigma_C^2/\sigma_a^2} \qquad (7)$$

where $\alpha$ and F are solved alternatively by using equations (6) and (7). Initially, $\alpha$ is set to $\alpha_0$ through a curve editing tool because the width and shape of feathering function depend on the resolution of the image, image sensor (e.g., the sensor point spread function), and the scene.

Furthermore, Bayesian matting and video matting solve the matting from the equation:

$$\alpha = \frac{(C-B)\cdot(F-B)}{\|F-B\|^2} \qquad (8)$$

Equation (8) works well in general but becomes unstable when F$\approx$B. In comparison, the coherence matting of Equation (7) can be solved more stably, because applying the coherence prior on $\alpha$ results in a non-zero denominator.

Video Matting Versus Coherence Matting

FIG. 9 illustrates an exemplary image 900 (which is a small window on one frame in the plaza data of FIG. 23). The image of FIG. 9 includes a redline 902 which will be utilized as a reference point when discussing FIGS. 10 and 11.

FIG. 10 illustrates exemplary alpha epipolar plane images ($\alpha$-EPI) 1002 and 1004 corresponding to the scanline 902 of FIG. 9, using the algorithm of video matting and coherence matting respectively. The alpha values (ranging between 0 and 255) along the scanline 902 are presented for the available 16 frames (i) in images 1002 and 1004. FIG. 10 also includes a solid line 1006 and a dotted line 1008 for reference purposes, which correspond to pixels across the 16 frames. A large jump is clearly visible at 1010 (e.g., where i=13 in the video matting approach).

FIG. 11 illustrates exemplary alpha curves for the two adjacent lines 1006 and 1008 of FIG. 10. In particular, alpha curves 1102 and 1104 correspond to the images 1002 and 1004, respectively. A curve 1106 corresponds to the line 1006 of image 1002 and a curve 1108 corresponds to the line 1008 of image 1002. Similarly, a curve 1110 corresponds to the line 1006 of image 1004 and a curve 1112 corresponds to the line 1008 of image 1004.

As can be seen, coherence matting (e.g., of image 1004 and alpha curve 1104) provides a more reasonable result when compared with video matting (e.g., of image 1002 and alpha curve 1102). For example, the jump at 1010 causes an accidental transparency within the face illustrated in FIG. 9, because the alpha value changes from about 126 to 0 and then to 180.

The temporal incoherence of the alpha matte from video matting can be more problematic during rendering. The fluctuation of alpha values along both dotted and solid lines (1106 and 1108) can generate incoherent alpha values and thus cause rendering artifacts for different viewpoints (i.e., along axis i). The alpha curve 1104 shows the same solid and dotted lines (1110 and 1112) with coherent matting results. Both lines have much less fluctuation between neighboring pixels, and appear temporally smoother than their counterparts in the alpha curve 1102.

A further comparison of video matting and coherence matting are illustrated with reference to FIGS. 12-14. In particular, FIG. 12 illustrates an exemplary reference image. The image of FIG. 12 includes a portion 1202 (corresponding to an ear of a furry rabbit). FIGS. 13 and 14 illustrate exemplary results of applying video matting (FIG. 13) and coherence matting (FIG. 14) to the portion 1202 of FIG. 12. As shown, the alpha matte from coherent matting (FIG. 14) is smoother that that from video matting (FIG. 13) in the rendered image.

User Interface For Pop-Up Light Field Construction

To construct a pop-up light field, a UI may be utilized. Through the UI, a user may specify, refine, and propagate layer boundaries, and indicate rendering artifacts. More layers may be popped up and refined until the user is satisfied with the rendering quality.

Figure 15:
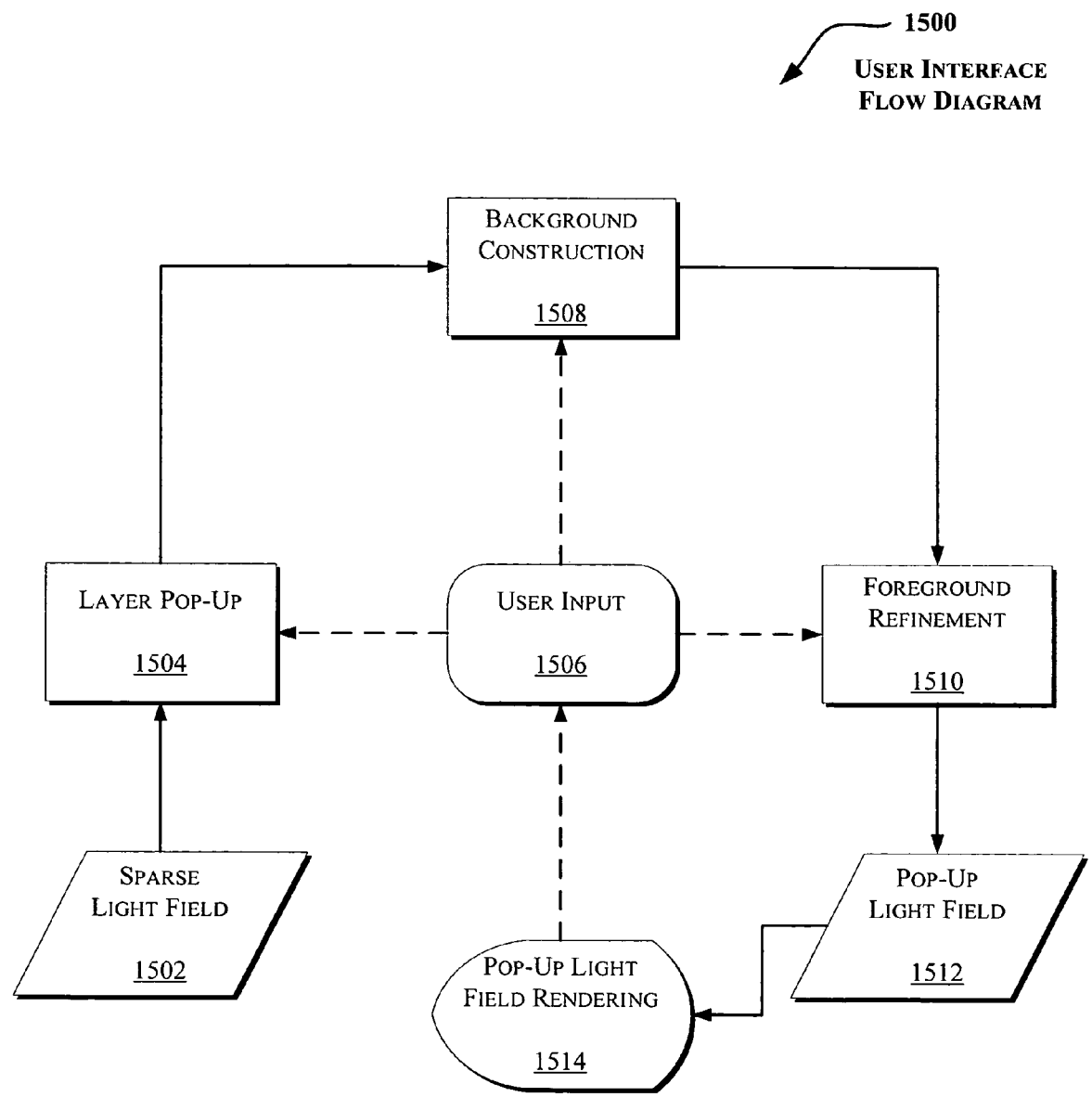
FIG. 15 illustrates an exemplary UI flow diagram for the pop-up light field construction.

FIG. 15 illustrates an exemplary UI flow diagram 1500 for the pop-up light field construction. A sparse light field repository 1502 is accessed by a layer pop-up module 1504. The layer pop-up module 1504 receives instructions from a user input module 1506. A background construction module 1508 receives layer pop-up information from the layer pop-up module and user input from the user input module 1506 to construct the background layer. A foreground refinement module receives background construction information from the module 1508 and user input from the module 1506 to refine the foreground layer. The output of the foreground refinement module 1510 is stored in pop-up light field repository 1512 and then provided to a pop-up light field rendering module 1514. The user may receive information from the pop-up light field rendering module 1514 and utilize it to provide appropriate input to the modules 1504, 1508, and 1510 to improve the quality of the rendered image.

Accordingly, a user can supply the information needed for layer pop-up (1504), background construction (1508), and foreground refinement (1510). By visually inspecting the rendering image from the pop-up light field (1514), the user may also indicate where aliasing occurs and thus which layer needs to be further refined. The user input or feedback may be automatically propagated across a group of the frames in the pop-up light field. The four stages of operations in the UI discussed with reference to FIG. 15 may be further summarized as follows:

(1) Layer Pop-Up (1504). This stage segments layers and specifies their geometries. To start, the user selects a key frame in the input light field, specifies regions that need to be popped up, and assigns the layer's geometry by either a constant depth or a plane equation. This stage results in a coarse segmentation represented by a polygon. The polygon region and geometry configuration can be automatically propagated across frames. Layers should be popped up in order of front-to-back in an implementation.

(2) Background Construction (1508). This stage obtains background mosaics that are needed to estimate the alpha mattes of foreground layers. Note that the background mosaic is useful only for the pixels around the foreground boundaries, i.e., in the uncertain region as discussed with reference to FIG. 7. Further details regarding background construction will be discussed with reference to FIG. 22.

(3) Foreground Refinement (1510). Based on the constructed background layers (1508), this stage refines the alpha matte of the foreground layer by applying the coherence matting algorithm. Unlike layer pop-up in stage (1), foreground refinement in this stage should be performed in back-to-front order in one implementation.

(4) Rendering Feedback (1512 and 1514). Any modification to the above stages (e.g., through 1506) will update the underlying pop-up light field data. The rendering window will be refreshed with the changes as well. By continuously changing the viewpoint the user can inspect for rendering artifacts. The user can mark any rendering artifacts such as ghosting areas by brushing directly on the rendering window. The corresponding frame and layer will then be selected for further refinement.

User Interface Design

FIGS. 16-20 illustrate exemplary workspaces associated with the UI discussed with reference to FIG. 15, through which the user interacts with a frame and/or a layer in the pop-up light field.

Figure 16:
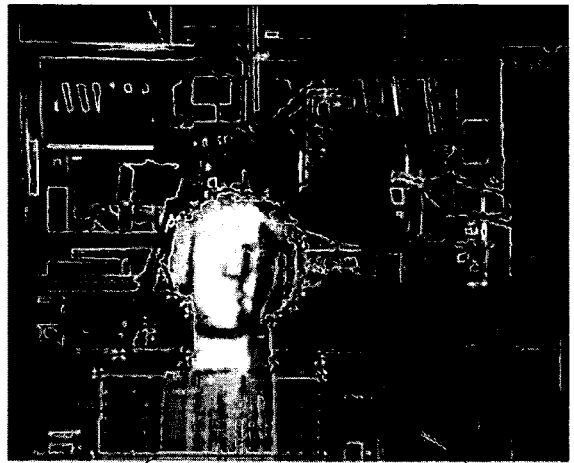
FIG. 16 illustrates an exemplary editing frame view for the UI of FIG. 15.

FIG. 16 illustrates an exemplary editing frame view for the UI of FIG. 15. The user can create or select an active layer and edit its polygon region. This active layer is displayed in polygons with crosses for each editable vertex (e.g., 1602 and 1604, respectively). The information regarding the active layer may be available in the layer navigator (shown at in FIG. 20).

Figure 17:
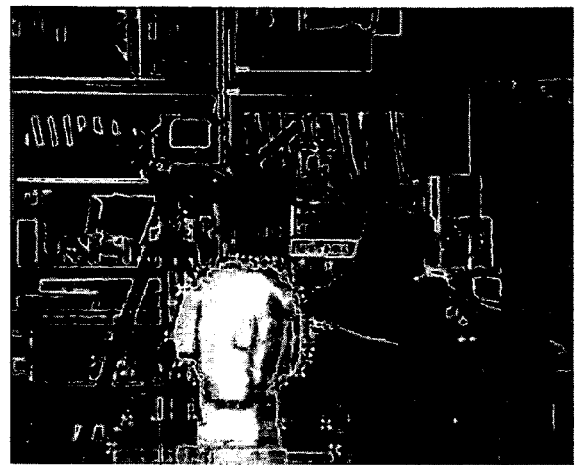
FIG. 17 illustrates an exemplary reference view for the UI of FIG. 15.

FIG. 17 illustrates an exemplary reference view for the UI of FIG. 15. The reference frame view may be used to display a different frame (than the one shown in FIG. 16 for example) in the light field. This workspace is useful for a number of operations where correspondences between the reference frame view (FIG. 17) and the editing frame view (FIG. 16) need to be considered, such as specifying plane equations. The reference view of FIG. 17 may also display polygons with crosses for each editable vertex (e.g., 1702 and 1704, respectively).

Figure 18:
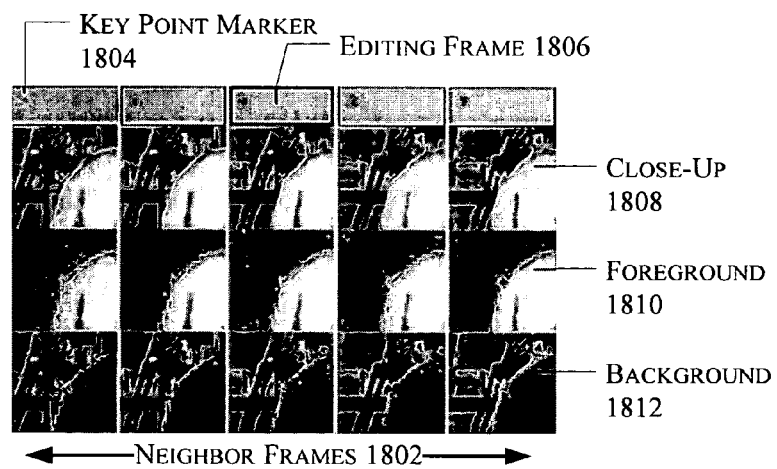
FIG. 18 illustrates an exemplary boundary monitor showing neighboring frames of the active layer.

FIG. 18 illustrates an exemplary boundary monitor showing neighboring frames (1802) of the active layer (such as that shown in FIG. 16). FIG. 18 shows close-up views of multiple frames in the light field. FIG. 18 may be utilized to fine-tune the polygon location for the active layer. A key point marker 1804 is shown for each frame. The active layer may appear in the middle (1806) of the neighboring frames (1802). The first row (1808) shows the close-up around the moving vertex. The second (1810) and third (1812) rows show the foreground and background of the active layer composed with a fixed background selected by the user. For instance, using mono fuchsia color in FIG. 18 as the background, it is easy for the user to observe over-segmentation or under-segmentation of the foreground across multiple frames simultaneously.

FIG. 19 illustrates an exemplary frame navigator for the UI of FIG. 15. The user may choose an active frame by clicking on a location marker (1902) of the frame navigator. One or more key points (1904) may be highlighted in the frame navigator with distinguishing indicia (such as a circle). The key points may correspond with the key point markers 1804 of FIG. 18.

FIG. 20 illustrates an exemplary layer navigator for the UI of FIG. 15. The user may obtain the active layer's information in FIG. 20. By utilizing a list 2002 (e.g., by selecting a layer which may be illustrated by a check mark in the list 2002), a user may view (2004), add (2006), or delete (2008) layers. For example, by selecting the layer in the check box of the list 2002, the user can turn on/off a layer's display in the editing frame view (FIG. 16) and reference frame view (FIG. 17). The plane equation of the active layer can be displayed and modified through user input (2010, 2012, and 2014).

In one implementation, layer equations can also be set through adjusting the rendering quality in a rendering window (not shown). A rendering window may enable display of any novel view in real time and allow the user to inspect the rendering quality. The user may also specify the frontal plane's equation for an active layer by sliding a plane depth back and forth until the best rendering quality (i.e., minimum ghosting) is achieved. If the ghosting cannot be completely eliminated at the occlusion boundaries, the layer's polygon may be fine tuned (e.g., by utilizing the editing view of FIG. 16). The user can brush on the ghosting regions, and the system can automatically select the affected frame and layer for modification. In one implementation, the affected layer is the front-most and closest to the specified ghosting region.

To specify the slant plane equation for a layer (2014), the user may select at least four pairs of corresponding points on the editing frame view (FIG. 16) and the reference frame view (FIG. 17). The plane equation can be automatically computed and then used for rendering.

In another implementation, the user can specify the feathering function (such as discussed with reference to FIG. 8). Specifying a feathering curve may be useful for the coherence matting algorithm discussed with reference to FIG. 7.

Layer Initialization and Refinement

To pop up a layer, the user segments and specifies the geometry of the active layer for a group of frames in the light field. To initialize a layer, polygons are used to represent layer boundaries (in part, because the correspondence between polygons can be maintained well in the frames by the corresponding vertices). The user can specify the layer's boundary with a polygon (e.g., using the polygon lasso tool and edit the polygon by dragging the vertices). The editing may be immediately reflected in the boundary monitor window such as FIG. 18 (and/or in the rendering window). The user may then select a proper key frame to work with and draws a polygon on the frame.

To specify the layer's geometry, the user provides further input. For a frontal plane, the layer depth is used to achieve the best rendering quality (e.g., as observed by the user). For a slant plane, the user specifies at least four pairs of corresponding points on at least two frames to estimate the plane equation.

Once the layer geometry is decided, the polygon on the first key frame can be propagated to the other frames by back projecting its vertices, resulting in a coarse segmentation of the layer on the frames in the light field. All vertices on the key frame may be marked as key points. At this stage, the layer has a global geometry which is shared across the frames.

Moreover, an accurate polygon boundary for layer initialization is not necessary. Because of occlusions and viewpoint changes, propagated polygon boundaries may need to be refined. More specifically, boundary refinement in a key frame may be achieved by adding, deleting, and moving the vertices on any frame. Once a vertex is modified, it may be marked as a key point. The position of the modified vertex can be propagated across frames and the layer region will be updated in several UI workspaces. To adjust a vertex position, the user can observe how well foreground and background colors are separated in the boundary monitor window (FIG. 18), or how much the ghosting effect is removed in the rendering window.

To provide boundary propagation across multiple frames, for a specific vertex on the layer boundary, if there is a non-key point on frame $I_P$, its image coordinate from the corresponding key points in other frames are interpolated. If there is only one key point in other frames, the coordinate may be computed by back projecting the intersection point of layer plane and the viewing ray from the key point. Otherwise, two or three "neighboring" frames may be selected that contain the key points. Then, the coordinate may be calculated by back projecting the 3 D point which has minimal sum of distances to the viewing rays from key points in the frames under consideration.

For a 1 D camera array, the two frames closest to the left and right of the frame $I_P$ may be selected (that contain key points). For a 2 D camera array, the Delaunay triangulation in the camera plane may be calculated by using all frames containing key points. Generally, Delaunay triangulation involves drawing a line between any two points whose Voronio domains touch to obtain a set of triangles. Given a set of points (such as key points discussed herein), obtaining Voronio domains involves splitting a plane in domains for which the first point is closest, the second point is closest, etc. Accordingly, if a frame $I_P$ is on the interior of a triangle, the three frames on the triangle vertices are considered "neighboring" frames.

FIG. 21 illustrates an exemplary neighboring frame selection display for a 2 D array. In FIG. 21, A, B, and D (2102) are the "neighboring" frames of frame b (2104). If frame $I_P$ is in the exterior of all triangles, two frames $I_0$ and $I_1$ may be selected that maximize the angle $\angle I_0 I_P I_1$ in camera plane. For example, A and D are the "neighboring" frames of a frame α (2106), as shown in FIG. 21. In one implementation, key points are those that have been modified by the user. They don't necessarily exist on key frames.

Coherence matting (which was discussed with respect to FIG. 7) may be utilized to assist a user in describing a layer boundary more accurately than just using polygons. For example, it cumbersome for the user to manually adjust to sub pixel accuracy a boundary with subtle micro geometry. A pixel is often blended with colors from both foreground and background due to the camera's point spread function. Therefore, the user is not required to specify very accurate sub-pixel boundary positions. Instead, the coherence matting algorithm (FIG. 7) may be applied to further refine the layer boundary. Polygon editing (in a frame and across frames) and coherence matting can be alternatively performed with assistance from the user (see, e.g., FIG. 15).

Constructing the Background

The coherence matting method discussed with reference to FIG. 7 assumes that the background for the uncertain regions (where matting is estimated) is known. Since the uncertain regions are located around the foreground boundaries, they can only appear on neighboring frames in the light field where these regions are disoccluded.

Figure 22:
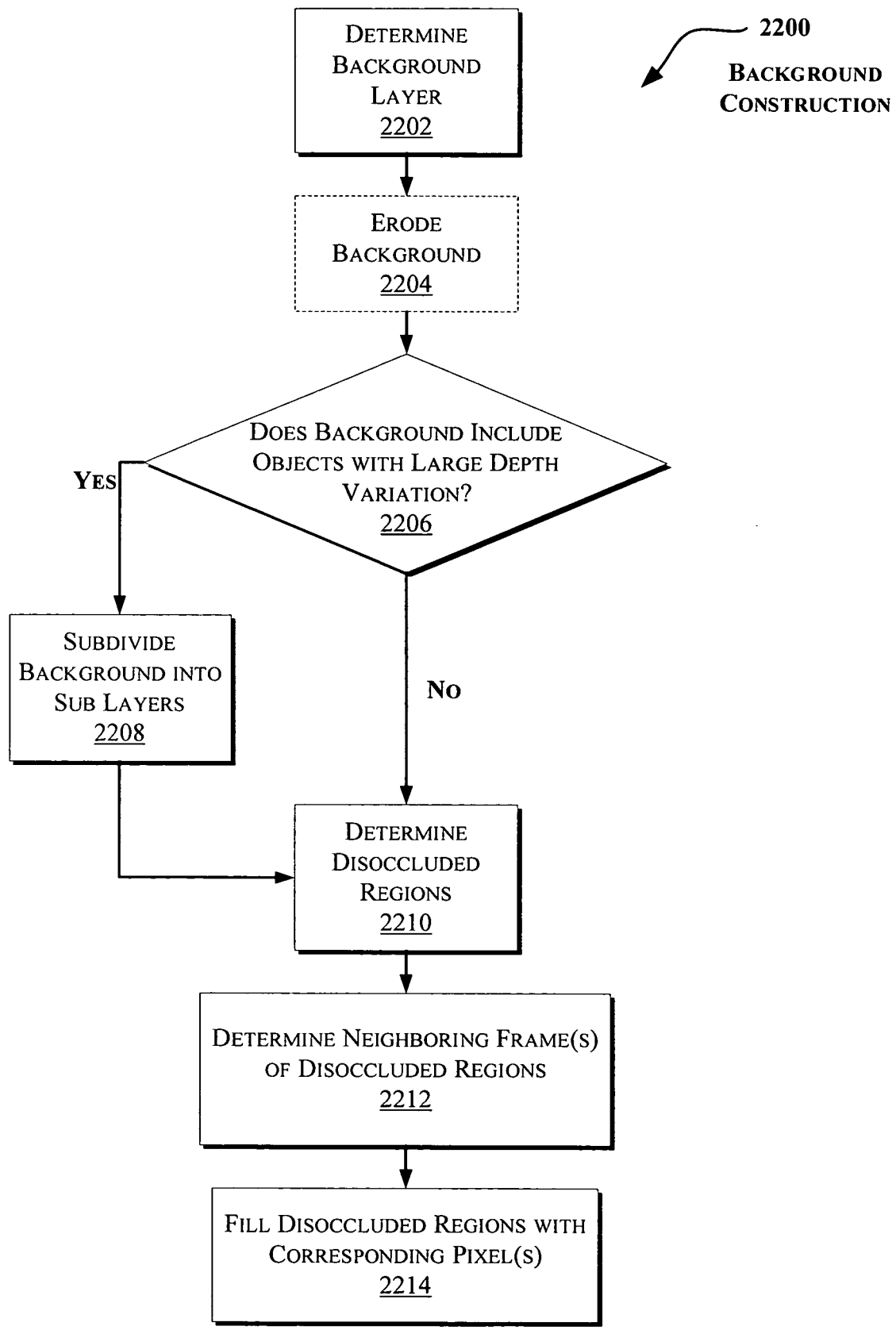
FIG. 22 illustrates an exemplary background construction method 2200 which fills the disoccluded region using pixels from neighboring frames.

FIG. 22 illustrates an exemplary background construction method 2200 which fills the disoccluded region using (warped) pixels from neighboring frames. The method 2200 includes a stage 2202 which determines the background layer. In one implementation, once the foreground is popped up, the background image can be obtained by removing the foreground image. Moreover, the background boundary is eroded (stage 2204) by a few pixels (e.g., two pixels) before constructing the background mosaic, because a possible under-segmentation of the foreground may leave some mixed foreground pixels on the background around boundaries.

The background may be constructed by warping the neighboring images to fill the holes using the background layer's geometry. This works well if the background is well approximated by plane, e.g. in FIG. 1. Accordingly, a stage 2206 determines whether the background includes objects with large depth variation. If the stage 2206 determines that the background includes objects with large depth variation, a stage 2208 subdivides the background layer into sub layers, each of which can be represented as one plane. If the stage 2206 returns a negative response or after the stage 2208, a stage 2210 determines the disoccluded regions. The neighboring frames of the disoccluded regions are determined by a stage 2212. And, a stage 2214 fills the disoccluded regions with corresponding pixels.

The method 2200 is further discussed with reference to FIGS. 23-25. FIG. 23 illustrates an exemplary sample image of a plaza. FIG. 24 illustrates an exemplary segmentation of a background layer of the image of FIG. 23 into four sub layers (or regions) using polygons 2402, 2404, 2406, and 2408. FIG. 25 illustrates an exemplary resulting background (with sub layers 2502, 2504 and 2506) corresponding to FIG. 24 wherein many missing pixels are filled.

As shown in FIG. 23, a background layer is segmented manually into four sub layers using polygons. It is envisioned that the location of the polygons are not critical. Instead, the goal is to group the background boundaries into a better planar approximation. The sub layers (such as those discussed with reference to FIG. 22) are propagated from the key frame, where the user specifies the division, to the other frames using the existing background layer geometry. This propagation requires less accuracy as long as it covers the same group of boundaries.

In one implementation, the relative motion of the sub layer across frames is estimated hierarchically, starting from translation to affine, and from affine to perspective transform. Only the pixels visible in both frames are used to estimate parameters. FIG. 25 shows the resulting mosaic. It is envisioned that a hole-free mosaic is unnecessary, as a few pixels surrounding the occlusion boundaries are adequate for coherence matting.

Local Geometry

When the viewpoint changes significantly, a single planar geometry may not be sufficient to achieve anti-aliased rendering. Therefore, a local geometry representation may be utilized which allows each frame to have its own planar equation.

Using the same UI discussed with reference to FIGS. 16-20, the plane equation can be estimated for each frame. The user may specify a few key frames' geometry, and the plane equations for frames in between can be interpolated. Similar to the "neighboring" frames selection in the boundary propagation, two (for 1 D camera array) or three (for 2 D camera array) key frames may be selected for interpolation. For the frontal plane model, the depth of the plane is interpolated. For 3 D plane model, the plane orientation can be interpolated while keeping the intersecting line if using two key frames, or the intersecting point if using three key frames. Once the plane equation is estimated for each frame, the same rendering algorithm can be applied as in using a global geometry.

FIGS. 26-28 illustrate exemplary results when applying local geometry versus global geometry. FIG. 26 illustrates an exemplary image with a global planar surface set as a frontal, parallel plane. FIG. 27 illustrates an exemplary rendering result from another view (other than the view shown in FIG. 26) with the global plane. FIG. 28 illustrates an exemplary view rendered with local geometry applied to FIG. 27. As can be seen, application of local geometry results in substantially more anti-aliasing, when the viewpoint changes significantly.

Real-Time Rendering of Pop-Up Field

An integral part of the UI is the ability to render pop-up light field in real-time (such as the pop-up light field rendering module 1514 of FIG. 15). This provides the user with instant feedback on the rendering quality. The rendering algorithm includes three stages: (1) splitting a light field into layers, (2) rendering layers in back-to-front order, and (3) combining the layers.

The following data structure may be used to provide the rendering:

```
struct PopupLightField {
    Array<CameraParameter> cameras;
    Array<Layer> layers;
};
struct Layer {
    Array<Plane> equations;
    Array<Image> images;
};
struct Image {
    BoundingBox box;
    Array2D<RGBA> pixels;
};
```

In one implementation, the pop-up light field keeps the camera parameters associated with all the input frames. Each layer in the pop-up light field has corresponding layered images, one for each frame. Each layered image has a corresponding plane equation, so as to represent the local geometry. If global geometry is applied to a layer, all equations are the same for images in this layer.

Since these corresponding layered images vary their shapes in different views, they are stored as an array of images on each layer. Layers can be overlapping in the pop-up light field and each layered image is modified independently by mosaicing and/or coherent matting.

Therefore, both color and opacity of images for each layer may be stored separately. In an implementation, each layered image is stored as an red-green-blue alpha (RGBA) texture image of the foreground colors with its opacity map, and a bounding box. The opacity (or alpha value) of the pixel is zero when this pixel is out of the foreground.

Layered Rendering Algorithm

In an implementation, the scene is rendered layer by layer using texture-mapped triangles in back-to-front order. Then, the layers are sequentially combined by alpha blending which is extended to multiple layers. A pseudo code for the rendering is shown below:

```
ClearFrameBuffer( )
T ← CreateRenderingPrimitives( )
for all layers Layer from back to front do
    for all triangles Δ ∈ T do
        SetupProjectiveTextureMapping( Δ )
        Render( Δ )
        BlendToFrameBuffer( Δ )
    end for
end for
```

Accordingly, after initializing a frame buffer, a set of triangular polygons is generated on which the original images are blended and drawn. First the camera positions are projected onto the image plane and these projection points are triangulated together with the image plane's four corner points into a set of triangles.

A triple of texture images $\{I_i\}_{i=1}^{3}$ are assigned to each triangle, which are blended across the triangle when rendering. The blending ratio $$\{w_i^k\}_{k=1}^{3}\left(0 \leq w_i^k \leq 1, \sum_{k=1}^{3} w_i^k = 1\right)$$

for three images are also assigned to each of the three vertices, and linearly interpolated across the triangle. The exact blending ratio based on ray angles is not necessarily distributed linearly on the screen. If the size of a triangle is not small enough with respect to the screen size, the triangle may be subdivided into four triangles iteratively. On the vertex which is the projection of a $I_i$'s camera, the blending ratio $w_i^k$ is calculated using the following equation:

$w_i^k=1$, if camera i is projected onto the k-th vertex=0, otherwise

For the vertex which is not the projection of a camera, the weights can be calculated using the angle between the ray through the camera and the ray through the vertex. Then, each layer can be rendered by blending texture images $\{I_i\}$ using blending ratios $\{w_i^k\}$. At the point other than the vertices on the triangle, the blending ratios $\{\tilde{v}_i\}$ are calculated by interpolating $\{w_i^k\}_{k=1}^3$. Using $\{I_i\}$ and $\{\tilde{v}_i\}$, the pixels on the triangle are drawn in the color.

$$\sum_{i=1}^{3} \tilde{v}_i I_i.$$

The texture images are mapped onto each triangle projectively. If $P_{view}$ is the projection matrix for the rendering camera (i.e., to produce the novel view), $P_i$ is the projection matrix for the camera corresponding to $I_i$, and $H_{layer}$ be a planar homography from the triangle to the layer plane. Then, the texture image $I_i$ can be mapped onto the triangle using a projection matrix $P_i H_{layer}$.

Hardware Implementation

Figure 29:
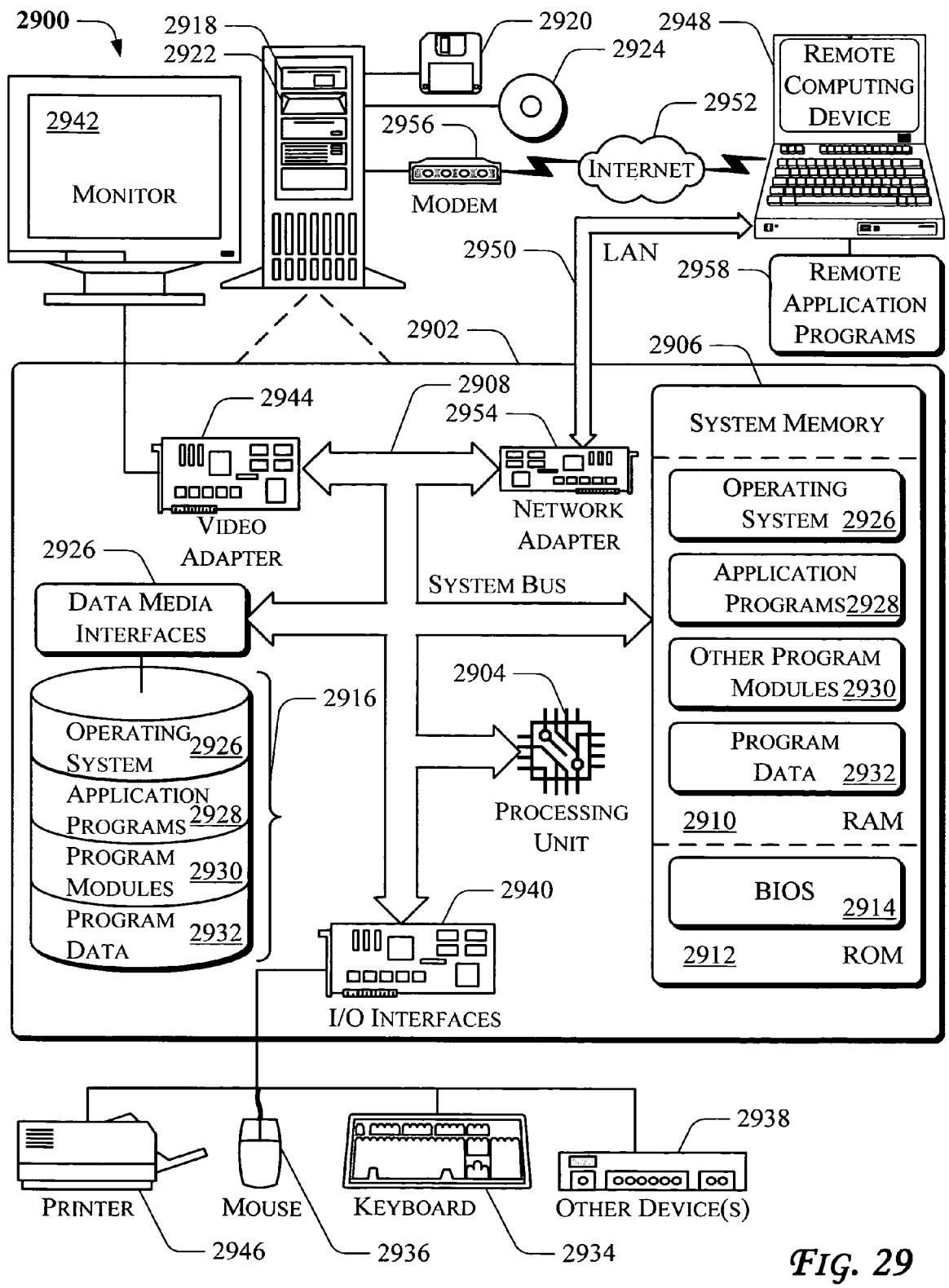
FIG. 29 illustrates a general computer environment 2900, which can be used to implement the techniques described herein.

FIG. 29 illustrates a general computer environment 2900, which can be used to implement the techniques described herein. The computer environment 2900 is only one example of a computing environment and is not intended to suggest any limitation as to the scope of use or functionality of the computer and network architectures. Neither should the computer environment 2900 be interpreted as having any dependency or requirement relating to any one or combination of components illustrated in the exemplary computer environment 2900.

Computer environment 2900 includes a general-purpose computing device in the form of a computer 2902. The components of computer 2902 can include, but are not limited to, one or more processors or processing units 2904 (optionally including a cryptographic processor or co-processor), a system memory 2906, and a system bus 2908 that couples various system components including the processor 2904 to the system memory 2906.

The system bus 2908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 2902 typically includes a variety of computer-readable media. Such media can be any available media that is accessible by computer 2902 and includes both volatile and non-volatile media, removable and non-removable media.

The system memory 2906 includes computer-readable media in the form of volatile memory, such as random access memory (RAM) 2910, and/or non-volatile memory, such as read only memory (ROM) 2912. A basic input/output system (BIOS) 2914, containing the basic routines that help to transfer information between elements within computer 2902, such as during start-up, is stored in ROM 2912. RAM 2910 typically contains data and/or program modules that are immediately accessible to and/or presently operated on by the processing unit 2904.

Computer 2902 may also include other removable/non-removable, volatile/non-volatile computer storage media. By way of example, FIG. 29 illustrates a hard disk drive 2916 for reading from and writing to a non-removable, non-volatile magnetic media (not shown), a magnetic disk drive 2918 for reading from and writing to a removable, non-volatile magnetic disk 2920 (e.g., a "floppy disk"), and an optical disk drive 2922 for reading from and/or writing to a removable, non-volatile optical disk 2924 such as a CD-ROM, DVD-ROM, or other optical media. The hard disk drive 2916, magnetic disk drive 2918, and optical disk drive 2922 are each connected to the system bus 2908 by one or more data media interfaces 2926. Alternatively, the hard disk drive 2916, magnetic disk drive 2918, and optical disk drive 2922 can be connected to the system bus 2908 by one or more interfaces (not shown).

The disk drives and their associated computer-readable media provide non-volatile storage of computer-readable instructions, data structures, program modules, and other data for computer 2902. Although the example illustrates a hard disk 2916, a removable magnetic disk 2920, and a removable optical disk 2924, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 2916, magnetic disk 2920, optical disk 2924, ROM 2912, and/or RAM 2910, including by way of example, an operating system 2926, one or more application programs 2928, other program modules 2930, and program data 2932. Each of such operating system 2926, one or more application programs 2928, other program modules 2930, and program data 2932 (or some combination thereof) may implement all or part of the resident components that support the distributed file system.

A user can enter commands and information into computer 2902 via input devices such as a keyboard 2934 and a pointing device 2936 (e.g., a "mouse"). Other input devices 2938 (not shown specifically) may include a microphone, joystick, game pad, satellite dish, serial port, scanner, and/or the like. These and other input devices are connected to the processing unit 2904 via input/output interfaces 2940 that are coupled to the system bus 2908, but may be connected by other interface and bus structures, such as a parallel port, game port, or a universal serial bus (USB).

A monitor 2942 or other type of display device can also be connected to the system bus 2908 via an interface, such as a video adapter 2944. In addition to the monitor 2942, other output peripheral devices can include components such as speakers (not shown) and a printer 2946 which can be connected to computer 2902 via the input/output interfaces 2940.

Computer 2902 can operate in a networked environment using logical connections to one or more remote computers, such as a remote computing device 2948. By way of example, the remote computing device 2948 can be a personal computer, portable computer, a server, a router, a network computer, a peer device or other common network node, game console, and the like. The remote computing device 2948 is illustrated as a portable computer that can include many or all of the elements and features described herein relative to computer 2902.

Logical connections between computer 2902 and the remote computer 2948 are depicted as a local area network (LAN) 2950 and a general wide area network (WAN) 2952. Such networking environments are commonplace in offices, enterprise-wide computer networks, intranets, and the Internet.

When implemented in a LAN networking environment, the computer 2902 is connected to a local network 2950 via a network interface or adapter 2954. When implemented in a WAN networking environment, the computer 2902 typically includes a modem 2956 or other means for establishing communications over the wide network 2952. The modem 2956, which can be internal or external to computer 2902, can be connected to the system bus 2908 via the input/output interfaces 2940 or other appropriate mechanisms. It is to be appreciated that the illustrated network connections are exemplary and that other means of establishing communication link(s) between the computers 2902 and 2948 can be employed.

In a networked environment, such as that illustrated with computing environment 2900, program modules depicted relative to the computer 2902, or portions thereof, may be stored in a remote memory storage device. By way of example, remote application programs 2958 reside on a memory device of remote computer 2948. For purposes of illustration, application programs and other executable program components such as the operating system are illustrated herein as discrete blocks, although it is recognized that such programs and components reside at various times in different storage components of the computing device 2902, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Exemplary Application Programs and Data

Figure 30:
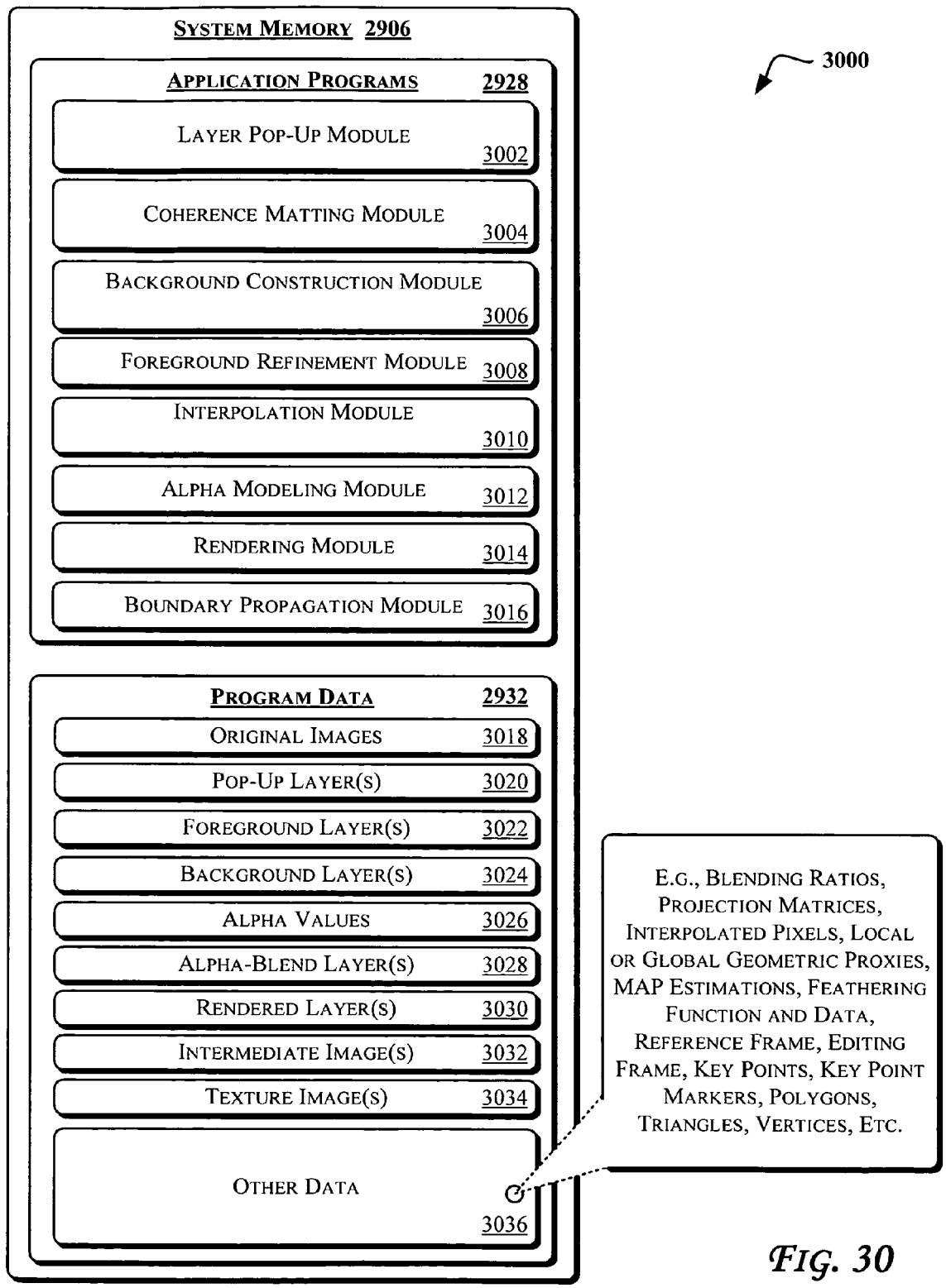
FIG. 30 illustrates an exemplary block diagram that shows further details of the system memory 2906 of FIG. 29.

FIG. 30 illustrates an exemplary block diagram 3000 that shows further details of the system memory 2906 of FIG. 29, including the application programs 2928 and the program data 2932 to present the pop-up light field. In this implementation, the application programs 2928 includes, for example, a layer pop-up module 3002(e.g., 1504 of FIG. 15), a coherence matting module 3004 (e.g., to implement the method 700 of F*ig*. 7), a background construction module 3006 (e.g., to implement the method 2200 of FIG. 22), a foreground refinement module 3008 (e.g., 1510 of F*ig*. 15), an interpolation module 3010 (such as discussed with reference to the layered rendering algorithm), an alpha modeling module 3012 (e.g., to implement the stage 710 of FIG. 7), a rendering module 3014 (e.g., to implement the real-time rendering of pop-up field), and a boundary propagation module 3016 (e.g., to implement the stage 704 of F*ig*. 7).

The program data 2932 includes an original image(s) 3018, pop-up layer(s) 3020 (such as those discussed with reference to FIGS. 4-5 and 16-20), foreground layer(s) 3022 (such as 402 of FIG. 4), background layer(s) 3024 (such as 404 of FIG. 4), alpha values 3026 (such as those discussed with reference to FIG. 11), alpha-blend layer(s) 3028 (such as those discussed with respect to the layered rendering algorithm), rendered layer(s) 3030 (such as those discussed with respect to the layered rendering algorithm), intermediate image(s) 3032 (such as those used for FIG. 18), texture image(s) 3034 (such as those discussed with respect to the layered rendering algorithm), and other data 3036 (such as those shown in FIG. 30).

Light Field Rendering Acceleration

Light field rendering may be accelerated using graphics hardware. In a layered rendering algorithm, layers are alpha-blended using alpha values assigned in texture images, which means each layer is rendered onto the frame buffer in a single pass. One straightforward way is to copy the frame buffer into memory and composite them after rendering each layer.

Figure 31:
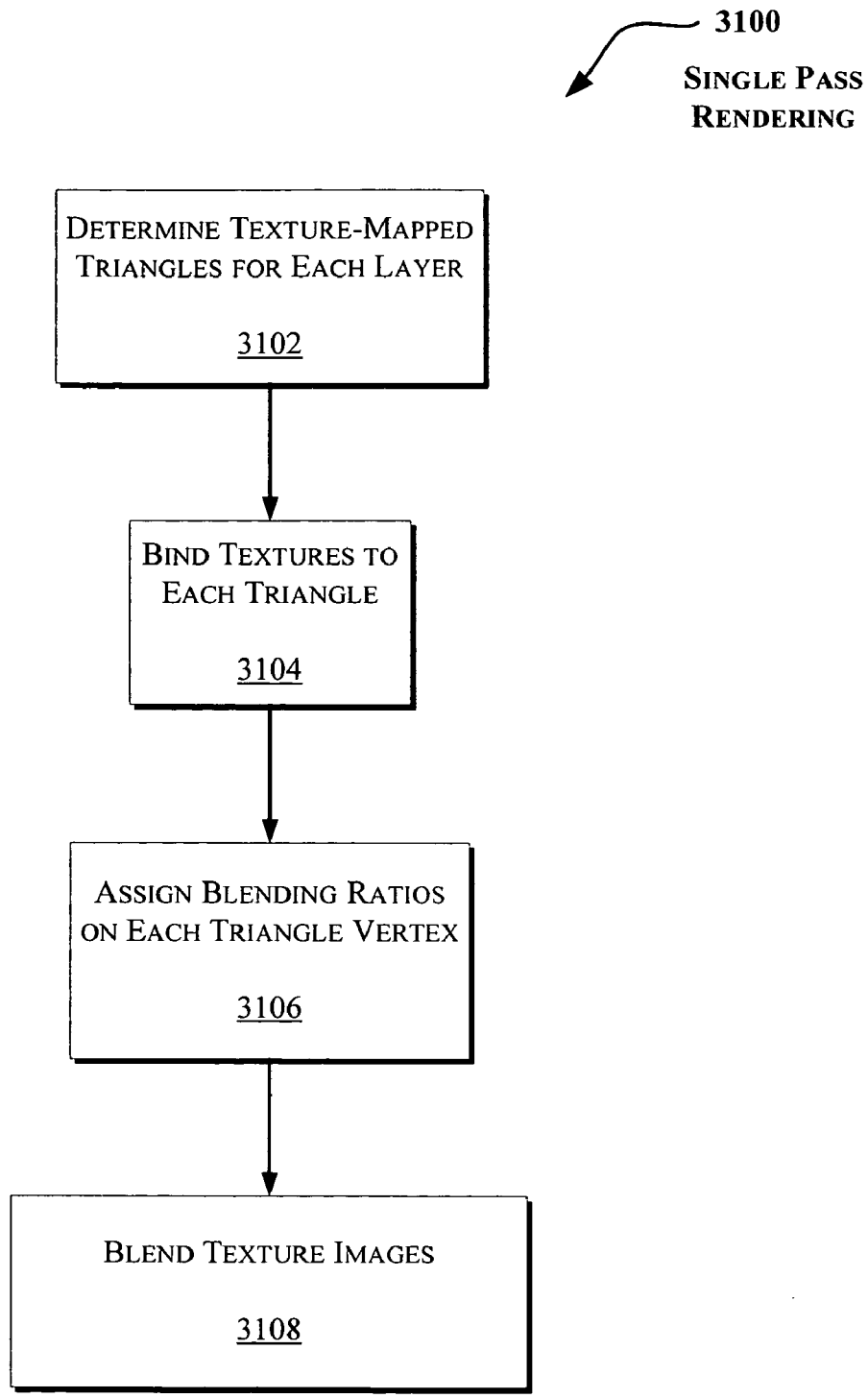
FIG. 31 illustrates an exemplary single pass rendering method 3100 to provide improved speed.

FIG. 31 illustrates an exemplary single pass rendering method 3100 to provide improved speed. The method 3100 uses multi-texture mapping and programmable texture blending which is available on modem graphics hardware.

To blend all textures on a single triangle, a stage 3102 determines the texture-mapped triangles for each layer. Three different textures may be assigned to each triangle. A stage 3104 binds the textures to each triangle. In a stage 3106, three blending ratios $\{w_1, w_2, w_3\}$ are assigned on each triangle vertex as the primary color $\{R,G,B\}$. The primary color may be smoothly interpolated on the triangle. Hence, the interpolated blending ratios $\{\tilde{v}_i\}$ are obtained by referring to the primary color at an arbitrary point on the triangle. Then, the texture images on the triangle can be blended (3108), for example, by using the blending equation programmed in the pixel shader in graphics hardware.

Accordingly, the layers can be composed by alpha-blending each triangle on the frame buffer when it is rendered because the triangles are arranged without overlap in a layer and each triangle is drawn in a single pass. In one implementation, OpenGL and its extensions for multi-texturing and per-pixel shading can be used.

CONCLUSION

Thus, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. One or more computer-storage media comprising computer executable instructions that configure one or more processors to perform a method comprising:
    utilizing one or more computers to split a scene into one or more coherent layers, wherein:
        each coherent layer of the scene has a corresponding plane equation to represent a local geometry of that coherent layer; and
        the one or more coherent layers in combination represent a single plane of the scene;
    propagating boundaries of the coherent layers across a plurality of frames corresponding to the scene;
    refining the splitting to present a virtual view of the scene; and
    rendering the coherent layers with a corresponding background layer to present the virtual view of the scene, wherein the background layer is provided by combining a plurality of under-segmented regions.

2. One or more computer-storage media as recited in claim 1, wherein the virtual view of the scene is substantially free from aliasing.

3. One or more computer-storage media as recited in claim 1, wherein each of the coherent layers has a corresponding background layer.

4. One or more computer-storage media as recited in claim 1, wherein the plurality of frames correspond to different images of the scene.

5. One or more computer-storage media as recited in claim 1, wherein the refining is initiated by a user.

6. One or more computer-storage media as recited in claim 1, wherein each layer of the scene has a corresponding plane equation to represent a local geometry of that layer.

7. One or more computer-storage media as recited in claim 1, wherein the scene represents a set of images.

8. A system comprising:
    one or more processors configured to execute computer-readable instructions;
    a computer storage medium configured to store the computer-readable instructions;
    a layer pop-up module to split a scene into one or more coherent layers;
    a boundary propagation module to propagate boundaries of the coherent layers across a plurality of frames corresponding to the scene;
    a refinement module to refine the splitting to present a virtual view of the scene; and
    a rendering module to render the coherent layers with a corresponding background layer to present the virtual view of the scene, wherein the background layer is provided by combining a plurality of under-segmented regions.

9. A system as recited in claim 8, wherein the virtual view of the scene is substantially free from aliasing.

10. A system as recited in claim 8, wherein the plurality of frames correspond to different images of the scene.

11. A system as recited in claim 8, wherein the refinement module is activated by a user.

12. A system as recited in claim 8, wherein each layer of the scene has a corresponding plane equation to represent a local geometry of that layer.

13. One or more computer-storage media comprising instructions stored thereon that direct a machine to perform acts comprising:
    splitting a scene into one or more coherent layers, wherein;
        each coherent layer of the scene has a corresponding plane equation to represent a local geometry of that coherent layer; and
        the one or more coherent layers in combination represent a single plane of the scene;
    propagating boundaries of the coherent layers across a plurality of frames corresponding to the scene, wherein the plurality of frames correspond to different images of the scene;
    refining the splitting to present a virtual view of the scene, wherein the refining;
        is initiated by a user;
        allows the user to select at least one of the coherent layers;
        allows the user to refine the corresponding plane equation of the selected coherent layer; and
        allows the user to inspect and adjust a rendering quality of the selected coherent layer in real time;
    rendering the coherent layers with a corresponding background layer to present the virtual view of the scene, wherein the background layer is provided by combining a plurality of under-segmented regions.

14. One ore more computer-storage media as recited in claim 13, wherein the virtual view of the scene is substantially free from aliasing.

15. One ore more computer storage media as recited in claim 13, wherein the scene represents a set of images.

16. An apparatus comprising:
    means for splitting a scene into one or more coherent layers;
    means for propagating boundaries of the coherent layers across a plurality of frames corresponding to the scene;
    means for refining the splitting to present a virtual view of the scene; and
    means for rendering the coherent layers with a corresponding background layer to display the virtual view of the scene, wherein the background layer is provided by combining a plurality of under-segmented regions.

* * * * *

UNITED STATES PATENT AND TRADEMARK OFFICE
CERTIFICATE OF CORRECTION

| | | |
|---|---|---|
| PATENT NO. | : 7,633,511 B2 | |
| APPLICATION NO. | : 10/817516 | |
| DATED | : December 15, 2009 | |
| INVENTOR(S) | : Heung-Yeung Shum et al. | |

It is certified that error appears in the above-identified patent and that said Letters Patent is hereby corrected as shown below:

In column 11, line 10, delete "2502" and insert -- 2502, --, therefor.

In column 18, line 42, in Claim 14, delete "ore" and insert -- or --, therefor.

In column 18, line 45, in Claim 15, delete "ore" and insert -- or --, therefor.

Signed and Sealed this
Fifteenth Day of February, 2011

David J. Kappos
*Director of the United States Patent and Trademark Office*